United States Patent
Shintani et al.

(10) Patent No.: US 9,232,445 B2
(45) Date of Patent: Jan. 5, 2016

(54) METHOD FOR MANAGING CS IRAT HANDOVER FROM 2G/3G NETWORK TO LTE NETWORK

(75) Inventors: Tatsuyuki Shintani, Tokyo (JP); Marianne Lampure, Berkshire (GB); Vincent Roger, Berkshire (GB); Luc Davit, Berkshire (GB)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 653 days.

(21) Appl. No.: 13/379,968

(22) PCT Filed: Feb. 12, 2010

(86) PCT No.: PCT/JP2010/052481
§ 371 (c)(1),
(2), (4) Date: Mar. 8, 2012

(87) PCT Pub. No.: WO2010/150568
PCT Pub. Date: Dec. 29, 2010

(65) Prior Publication Data
US 2012/0165019 A1    Jun. 28, 2012

(30) Foreign Application Priority Data
Jun. 25, 2009   (EP) .................................... 09163817

(51) Int. Cl.
*H04W 36/00* (2009.01)
*H04W 4/00* (2009.01)
(Continued)

(52) U.S. Cl.
CPC .......... *H04W 36/0022* (2013.01); *H04W 92/14* (2013.01)

(58) Field of Classification Search
CPC ............................ H04W 36/002; H04W 94/14

USPC ........... 455/436, 410, 437; 370/331, 352, 354
See application file for complete search history.

(56) References Cited

U.S. PATENT DOCUMENTS

2009/0131053 A1*   5/2009   Sachs et al. .................... 455/436
2011/0249652 A1*   10/2011  Keller et al. ................... 370/331

FOREIGN PATENT DOCUMENTS

CN          101415213 A      4/2009
WO       2008/038949 A1      4/2008
(Continued)

OTHER PUBLICATIONS

International Search Report (PCT/ISA/210) dated May 7, 2010, issued in counterpart International Application No. PCT/JP2010/052481.
(Continued)

*Primary Examiner* — Opiribo Georgewill

(57) ABSTRACT

The invention relates to a method to manage a CS IRAT (Circuit Switch Inter RAT) handover of a user equipment (UE) from a 2G/3G network to a LTE (Long Term Evolution) network in which: the UE transmits its CS IRAT handover from 2G/3G to LTE capabilities to the BSC/RNC node; the BSC/RNC node selects a routing paths among said different routing paths based on the UE capabilities for CS IRAT handover from 2G/3G to LTE and transmits to a MSC/VLR node (Mobile services Switching Center) of said 2G/3G network a Handover message comprising an information indicative of the selected path corresponding to the selected CS handover technology; and the MSC/VLR node transfers said Handover message to said target eNodeB through a MME (Mobility Management Entity) node or through an IWF node (Interworking Function) depending on the selected CS handover technology.

7 Claims, 5 Drawing Sheets

(51) Int. Cl.
*H04L 12/66* (2006.01)
*H04W 92/14* (2009.01)

(56) References Cited

FOREIGN PATENT DOCUMENTS

| WO | 2008/081310 A1 | 7/2008 |
|---|---|---|
| WO | 2008/148429 A1 | 12/2008 |
| WO | 2009/121745 A1 | 10/2009 |

OTHER PUBLICATIONS

Written Opinion (PCT/ISA/237) dated May 7, 2010, issued in counterpart International Application No. PCT/JP2010/052481.

Extended European Search Report dated Dec. 23, 2009, issued by the European Patent Office in counterpart application No. 09163817.1.

3GPP, "3$^{rd}$ Generation Partnership Project; Technical Specification Group Services and System Aspects; 3GPP System Architecture Evolution: Report on Technical Options and Conclusions (Release 7)" Jan. 9, 2008, 224 pages.

Communication dated Aug. 4, 2014 from the State Intellectual Property Office of the People's Republic of China in counterpart application No. 201080032396.8.

Technical Report, "3rd Generation Partnership Project; Technical Specification Group Services and System Aspects; Study on Circuit Switched (CS) domain services over evolved Packet Switched (PS) access;" Stage 2 (Release 9), 3GPP TR 23.879 V9.0.0, Mar. 2009, pp. 1-60.

Technical Report, "3rd Generation Partnership Project; Technical Specification Group Services and System Aspects; 3GPP System Architecture Evolution: Report on Technical Options and Conclusions," (Release 8) 3GPP TR 23.882 V8.0.0, Sep. 2008, pp. 1-234.

3GPP TR23.882 V1.13.1 (Jan. 2008), "3$^{rd}$ Generation Partnership Project; Technical Specification Group Services and System Aspects; 3GPP System Architecture Evolution: Report on Technical Options and Conclusions (Release 7)" Jan. 9, 2008, 224 pages.

Communication dated Sep. 3, 2013, issued by the Japanese Patent Office in corresponding Application No. 2011-553997.

Alcatel-Lucent, "Addition of an alternative to CS over PS", TD S2-087575, 3GPP TSG SA WG2 Meeting #69, Nov. 17-21, 2008, pp. 1-14.

Nokia, "LTE Mobility Signalling", R2-061137, 3GPP TSG-RAN WG2 Meeting #53, May 8-12, 2006, pp. 1-5.

T-Mobile et al., "Cleanup of Section 5.2.2 in TR 23.879", TD S2-090817, 3GPP TSG SA WG2 Meeting #70, Jan. 12-16, 2009, pp. 1-17.

\* cited by examiner

| RNC mapping table | |
|---|---|
| param receive | param sent |
| eNodeB ARFCN UE is SRVCC capable | eNodeB CGI |
| eNodeB ARFCN UE is CSoPS capable | 2G/3G virtual CGI |

*FIG. 2A*

| MSC routing table | |
|---|---|
| param receive | route to |
| eNodeB CGI | MME |
| 2G/3G virtual CGI | 2G/3G virtual RNC/BSC (=IWF) |

*FIG. 2B*

| IWF mapping table | |
|---|---|
| param receive | param sent |
| 2G/3G virtual CGI | eNodeB ARFCN |

*FIG. 2C*

| RNC mapping table | |
|---|---|
| param receive | param sent |
| eNodeB ARFCN UE is SRVCC capable | eNodeB CGI, SRVCC Id |
| eNodeB ARFCN UE is CSoPS capable | eNodeB CGI, CSoPS Id |

*FIG. 2D*

| MSC mapping table | |
|---|---|
| param receive | route to |
| eNodeB CGI, SRVCC Id | MME |
| eNodeB CGI, CSoPS Id | IWF |

*FIG. 2E*

METHOD FOR MANAGING CS IRAT HANDOVER FROM 2G/3G NETWORK TO LTE NETWORK

PRIORITY CLAIM

Priority is claimed on European Patent Application No. 09163817.1, filed Jun. 25, 2009, the content of which is incorporated herein by reference.

TECHNICAL FIELD

The invention pertains to telecommunication field and concerns a method to manage a CS IRAT (Circuit Switch Inter RAT (Radio Access technology)) handover of a user Equipment from a 2G/3G network to a LTE (Long Term Evolution) network wherein at least two different routing paths depending on at least two different handover technologies are possible for transferring Handover messages from a BSC/RNC (Base Station Controller/Radio Network Controller) node of said 2G/3G network to a target eNodeB of said LTE network.

The invention also concerns a 2G/3G network BSC/RNC node comprising means for selecting a routing paths for transmitting a Handover message from a MSC/VLR node in a 2G/3G network to a target eNodeB in an LTE network, in order to handover a user Equipment performing a CS call in said 2G/3G network.

The invention also concerns a 2G/3G network MSC node comprising means for routing the handover message to a target eNodeB in a LTE network according to the selected path indicated by the RNC/BSC node.

The invention also concerns a User Equipment comprising means for indicating its CS IRAT handover capabilities to a 2G/3G RNC/BSC node.

BACKGROUND ART

3GPP has defined two technologies to manage CS calls (e.g. voice calls) in EUTRAN: CS over PS (CSoPS) and Voice over IMS (VoIMS over LTE). Each of these two technologies requires a specific handover procedure from EUTRAN to GERAN/UTRAN, i.e., CSoPS handover for CSoPS, or Single-Radio Voice Call Continuity (SRVCC) for handover from VoIMS over LTE to CS GERAN/UTRA.

For both SRVCC and CSoPS technologies, the CS IRAT handover from GERAN/UTRAN to EUTRAN is not defined and is considered as for further study in the standard. It can be assumed that, similarly to any other handover technologies (like CS 2G/3G, PS 2G/3G, LTE, CS GAN (Generic Access Network)), the CS IRAT handover from GERAN/UTRAN to EUTRAN will be using a reverse sequence than the CS IRAT handover from EUTRAN to GERAN/UTRAN. This means that, for both cases, the RNC/BSC initiates the handover by sending a "Handover Required" message to the MSC/VLR to manage the handover.

FIG. 1 illustrates different routing paths for transmitting a handover message from the Radio Access Network of the 2G/3G Network (GERAN/UTRAN: GSM Radio Access Network-UMTS Terrestrial Radio Access Network) to Radio Access Network of the LTE Network (EUTRAN—Evolved Universal Terrestrial Radio Access Network).

It is then expected that for SRVCC, the MSC/VLR triggers the Handover by sending a message to MME (Mobility Management Entity), via the Sv interface (MME-MSC/VLR) which is the reference point defined for handling the SRVCC handover between 3GPP E-UTRAN/UTRAN (HSPA) and 3GPP UTRAN/GERAN, and for CSoPS, the MSC/VLR triggers the Handover by sending a message to IWF, via the A/Iu interface which is known to support the handover in GERAN/UTRAN and which is reused by CSoPS technology.

Consequently, for a network supporting both SRVCC and CSoPS IRAT handover from GERAN/UTRAN to EUTRAN, two different routing paths are possible in MSC/VLR for transferring the Handover Required message. So there is a need to identify to which target node (IWF for CSoPS or MME for SRVCC) the MSC/VLR shall transfer the "Handover Required (target eNodeB cell ID)" message received from RNC/BSC.

DISCLOSURE OF INVENTION

The invention is based on the fact that for the new expected CS IRAT handover sequence from a 2G/3G network to a LTE network, two different routing, corresponding respectively to a SRVCC IRAT handover path and a CSoPS IRAT handover path, are possible in the MSC/VLR node (Mobile services Switching Center) of said 2G/3G for transferring the Handover Required message from GERAN/UTRAN to EUTRAN.

The invention enables a correct routing of handover required message by MSC/VLR to either IWF (CSoPS) or MME (SRVCC).

This object is achieved by means of a method to manage a CS IRAT (Circuit Switch Inter RAT) handover of a user equipment (UE) from a 2G/3G network to an LTE (Long Term Evolution) network wherein at least two different routing paths corresponding to at least two different handover technologies are possible for transferring the Handover messages from a BSC/RNC (Base Station Controller/Radio Network Controller) node of said 2G/3G network to a target eNodeB of said LTE network.

The method according to the invention comprises the following steps:
- the UE transmits its capabilities for CS IRAT handover from 2G/3G to LTE to the BSC/RNC node;
- the BSC/RNC node selects a routing paths among said different routing paths based on the UE capabilities for CS IRAT handover from 2G/3G to LTE and transmits to a MSC/VLR node (Mobile services Switching Center) of said 2G/3G network a Handover message comprising an information indicative of the selected, path corresponding to the selected CS handover technology; and
- the MSC/VLR node transfers said Handover message to said target eNodeB through a MME (Mobility Management Entity) node or through an IWF node (Interworking Function) depending on the selected CS handover technology.

In a first embodiment, said information indicative of the selected path is a target cell identifier.

In a second embodiment of the invention, said information indicative of the selected path is a supplementary parameter associated with an identifier of the selected CS handover technology.

The method according to the invention is implemented for managing a CS IRAT handover when the different handover technologies consist of the CS handover technologies SRVCC (Single Radio Voice Call Continuity) and CSoPS (Circuit switched over Packet Switched).

The method according to the invention wherein said UE capabilities for CS IRAT handover include the support of SRVCC handover from 2G/3G to LTE, or the support of CSoPS handover from 2G/3G to LTE or the support of both SRVCC and CSoPS handovers from 2G/3G to LTE.

In a first variant, when the RNC/BSC node detects the need to handover the UE to the LTE network for a CS call, it sends to the MSC/VLR a Handover message including the target LTE cell ID (eNodeB CGI), in case of SRVCC handover, or a virtual 2G/3G cell ID, in case of CSoPS handover, said IDs are pre-configured in the mapping and routing tables of BSC/RNC node, MSC/VLR node and the IWF node to allow the association of the LTE cell ID with the virtual 2G/3G cell ID.

In a second variant, when RNC/BSC detects the need to handover the UE to the LTE network for the CS call, it sends a Handover message including the target LTE cell ID and an indicator informing the MSC/VLR whether the handover is a SRVCC or a CSoPS handover.

The invention may also concern a BSC/RNC node comprising selecting unit which selects a routing paths for transmitting a Handover message from a MSC/VLR node in a 2G/3G network to a target eNodeB in a LTE network, in order to handover a user Equipment performing a CS call in said 2G/3G network, said Handover message comprising information indicating a specific path for transmitting said Handover message from the MSC/VLR node to the target eNodeB.

The invention may also concern a MSC/VLR node configured to communicate with a RNC/BSC in a 2G/3G network in order to manage a CS IRAT (Circuit Switch Inter RAT) handover of a user Equipment from said 2G/3G network to a LTE (Long Term Evolution) network wherein at least two different routing paths corresponding to at least two different handover technologies are possible for transferring the Handover messages from the BSC/RKC node of said 2G/3G network to a target eNodeB of said LTE network via said MSC/VLR node, said MSC/VLR node comprising an analyzing unit which analyzes indicators received from said RNC/BSC node to indicate which handover technology is to be used, and a routing unit which route said Handover messages depending on the analyzed indicators.

The invention also concerns a user equipment (UE) roaming between an area covered by a 2G/3G network and area covered by a LTE (Long Term Evolution) network, said UE being configured to transmit its capabilities to a RNC/BSC node of said 2G/3G network in order to manage a CS IRAT (Circuit Switch Inter RAT) handover of said UE from said 2G/3G network to a LTE (Long Term Evolution) network wherein at least two different routing paths corresponding to at least two different handover technologies are possible for transferring the Handover messages from the BSC/RNC.

BRIEF DESCRIPTION OF THE DRAWINGS

The forgoing summary, as well as the following detailed description, will be better understood when read in conjunction with the appended figures illustrating an exemplary embodiment of the invention in which:

FIGS. 2A, 2B and 2C represent tables illustrating the configuration of network routing and mapping of the RNC/BSC node, the MSC/VLR node and the IWF node during the handover according to a first embodiment of the invention;

FIGS. 2D and 2E represent tables illustrating the configuration of network routing and mapping of the RNC/BSC node, the MSC/VLR node during the handover according to a second embodiment of the invention;

BEST MODE FOR CARRYING OUT THE INVENTION

The invention will be described in the case of a CS IRAT handover of two User Equipments/UE1 and UE2, camping in a cell of a 2G/3G Network to a cell in a LTE Network supporting both SRVCC (Single Radio Voice Call Continuity) and CSoPS (Circuit switched over Packet Switched).

It is assumed that UE1 is CSoPS capable and supports CSoPS-based CS IRAT handover from GERAN/UTRAN to EUTRAN during a CS call established in the UTRAN/GERAN, and UE2 is SRVCC capable and supports SRVCC-based CS IRAT handover from GERAN/UTRAN to EUTRAN during the CS call established in the UTRAN/GERAN It is assumed that UE1 and UE2 are initially attached to a BTS/NodeB 2 in a 2G/3G cell and transmit their capabilities to a BSC/RNC 4 (Base Station Controller/Radio Network Controller) in the 2G/3G network.

When the BSC/RNC node 4 detects the need to handover (HO) the UEs to the LTE network for the CS call, it sends a Handover message including the target LTE cell ID and an indicator informing the MSC/VLR 8 whether the handover is a SRVCC or a CSoPS handover.

If the indicator received by the MSC/VLR 8 from RNC/BSC 4 indicates SRVCC handover, the MSC/VLR 8 sends the handover message to a Mobility Management Entity (MME node) 10 located in the LTE network. Else; if the indicator received by the MSC/VLR 8 from RNC/BSC 4 indicates CSoPS handover, the MSC/VLR 8 sends the handover message to a Interworking Function node 12 (IWF node) located in the LTE network.

The invention will be explained in details by reference to the tables of FIGS. 2A-2E illustrating the configuration of network mapping and routing of the RNC/BSC 4, the IWF 12 and the MSC/VLR 8 during the handover.

Figure 1:
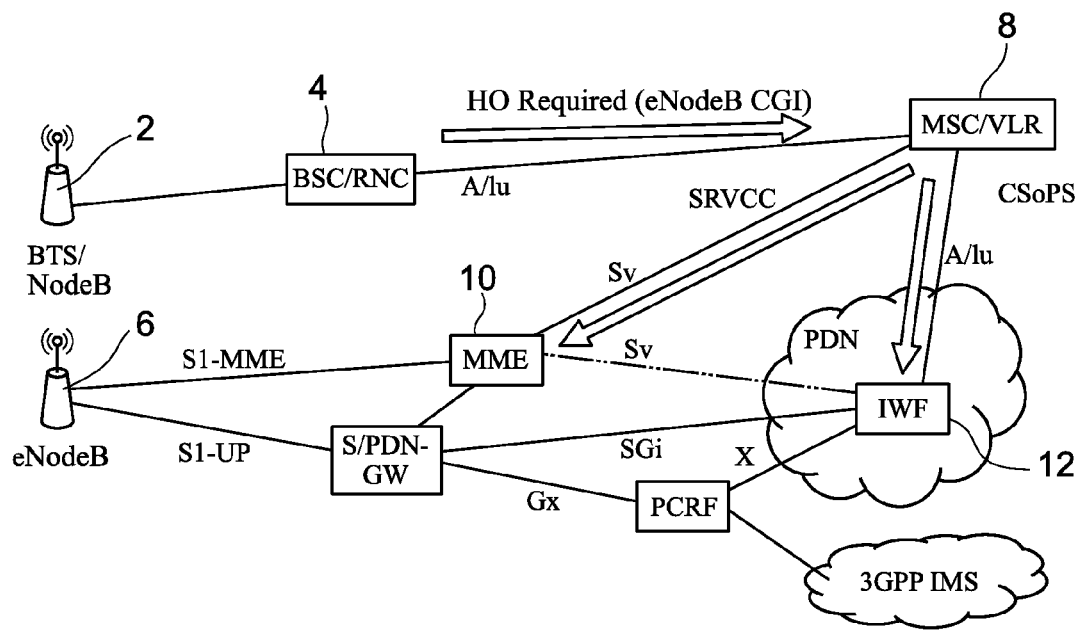
FIG. 1 schematically illustrates different routing paths between for a CS handover from GERAN/UTRAN to EUTRAN.
Figure 3:
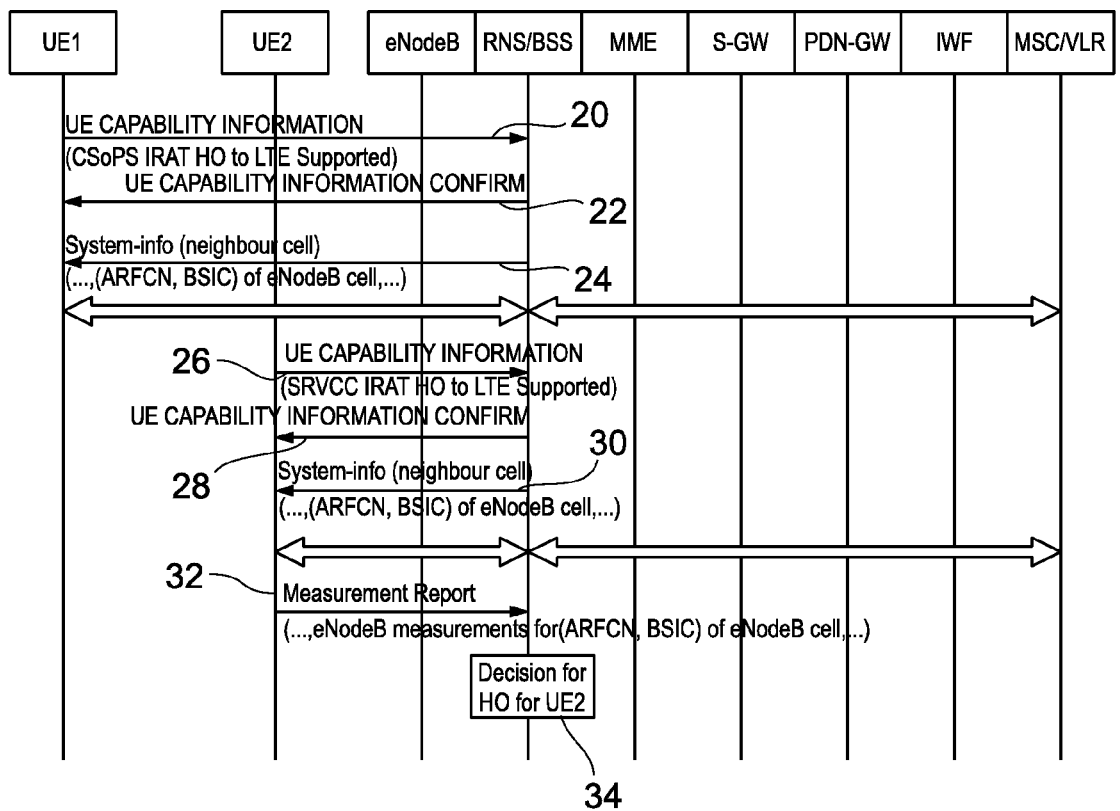
FIG. 3 illustrates the preparation of CS IRAT handover for a UE supporting SRVCC and a UE supporting CSoPS.

Referring now to FIG. 3, at step 20, UE1 transmits its capabilities to the BSC/RNC 4 and receives a confirmation message from said BSC/RNC 4 at step 22.

At step 24, BSC/RNC 4, transmits to UE1 information indicating the neighbor cells along with target eNodeB (ARFCN, BSIG).

A similar exchange is performed between UE2 and BSC/RNC 4 at steps 26 to 30.

At step 32, UE2 transmits to BSC/RNC 4 measurement report that allows BSC/RNC 4 to make a decision regarding UE2 handover at step 34.

Figure 4:
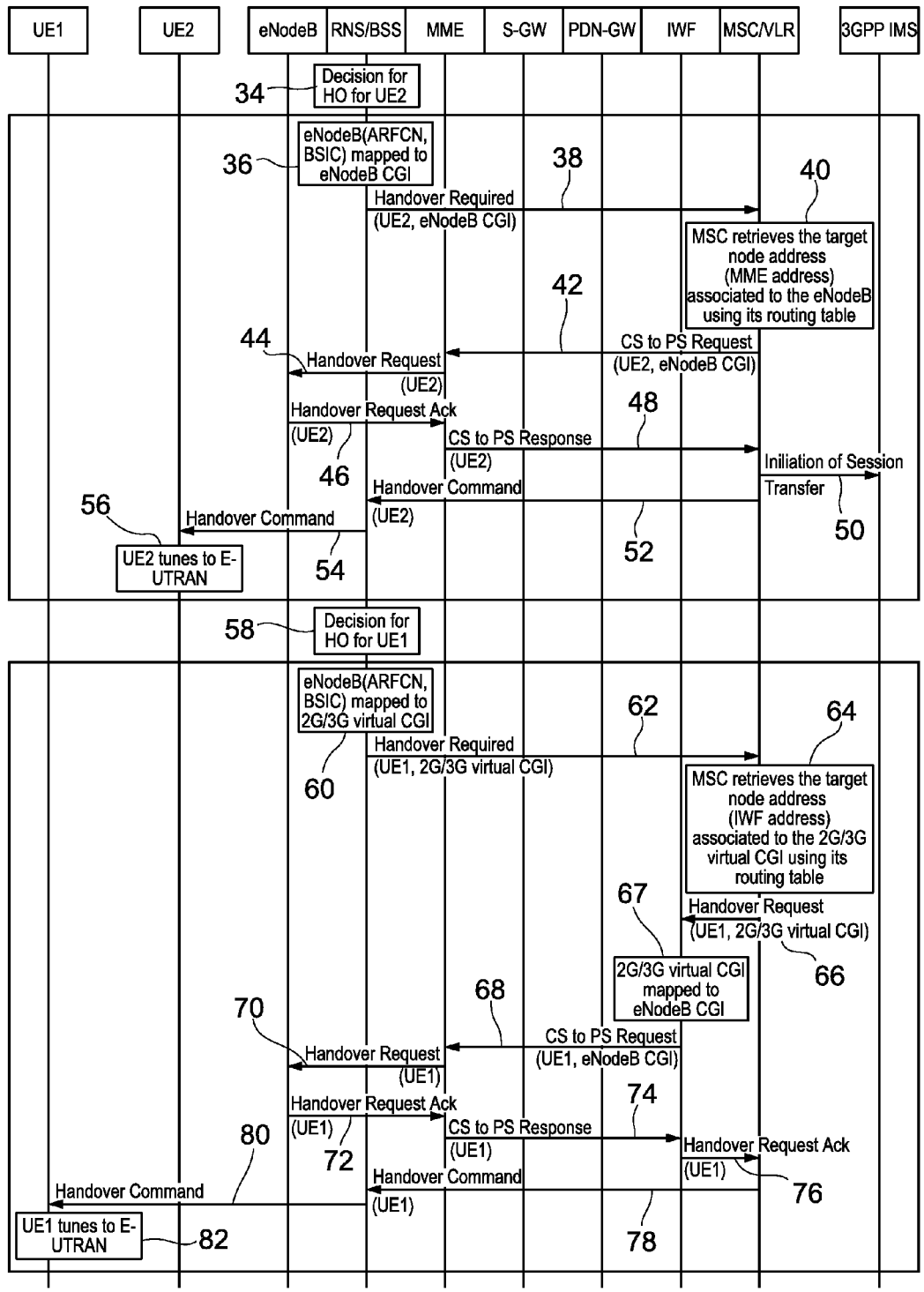
FIG. 4 illustrates the CS IRAT handover via SRVCC and CSoPS according to a first embodiment of the invention.

FIG. 4 illustrates the steps of the method according to a first embodiment of the invention when the BSC/RNC 4 detects the need of a CS IRAT handover to LTE for UE2 (respectively UE1) in which RNC/BSC 4 provides MSC/VLR 8 with a target cell ID indicating whether the handover is a SRVCC or CSoPS handover.

At step 34 the BSC/RNC 4 initiates a CS IRAT handover to LTE for UE2, using SRVCC.

At step 36, the eNodeB ARFCN (Absolute Radio Frequency Channel Number) and the eNodeB BSIC (Base Station Identity Code) are mapped to eNodeB CGI (Cell Global Identity) as illustrated in the RNC/BSC mapping table of FIG. 2A.

At step 38, the BSC/RNC 4 transmits to the MSC/VLR/VLR 8 a handover request message comprising UE2 and eNodeB CGI.

At step 40, the MSC/VLR 8 retrieves the target node address (MME address) associated to the eNodeB using its routing table as illustrated at FIG. 2B and transmits said handover request message to the MME node 10 at step 42.

At step 44, the MME node 10 forwards said handover request message to the target eNodeB 6.

At step 46, the target eNodeB 6 sends an acknowledgement to the MME node 10.

At step 48, the MME node 10 transmits to MSC/VLR 8 a message comprising a response to the handover request of UE2 from CS to PS.

At step 50, MSC/VLR 8 requests the 3GPP IMS (IP Multimedia Subsystem) to initiate a Session transfer.

At step 52, the MSC/VLR 8 sends to the BSC/RNC 4 a Handover Command.

At step 54, BSC/RNC 4 forwards Handover Command to UE2.

At step 56, UE2 tunes to E-UTRAN.

At step 58, the BSC/RNC 4 initiates a CS IRAT handover to LTE, using CSoPS.

At step 60, the eNodeB ARFCN (Absolute Radio Frequency Channel Number) and the eNodeB BSIC (Base Station Identity Code) are mapped to 2G/3G virtual CGI (Cell Global Identity) as illustrated in the RNC/BSC mapping table of FIG. 2A.

At step 62, the BSC/RNC 4 transmits to the MSC/VLR/VLR 8 a handover request message comprising UE1 and 2G/3G virtual CGI mapping.

At step 64, the MSC/VLR 8 retrieves the target node address (IWF address) associated to the 2G/3G virtual CGI using its routing table as illustrated at FIG. 2B and transmits said handover request message to the IWF node 12 at step 66.

At step 67, the 2G/3G virtual CGI (Cell Global Identity) is mapped to the eNodeB CGI as illustrated in the RNC/BSC mapping table of FIG. 2C. At step 68, the IWF node 12 transmits to the MME node 10 a message comprising a request to switch the DEI from CS to PS and the target eNodeB CGI.

At step 70, the MME node 10 transmits to the target eNodeB the handover request for UE1.

At step 12, the target eNodeB sends an acknowledgement to the MME node 10.

At step 74 the MME node 10 transmits to the IWF node 12 a response concerning the handover request for UE1.

At step 76, the IWF node 12 forwards said response to the MSC/VLR 8. The later sends, at step 78 a Handover Command to the BSC/RNC 4 which execute said handover at step 80.

At step 82, UE1 tunes to E-UTRAN.

Figure 5:
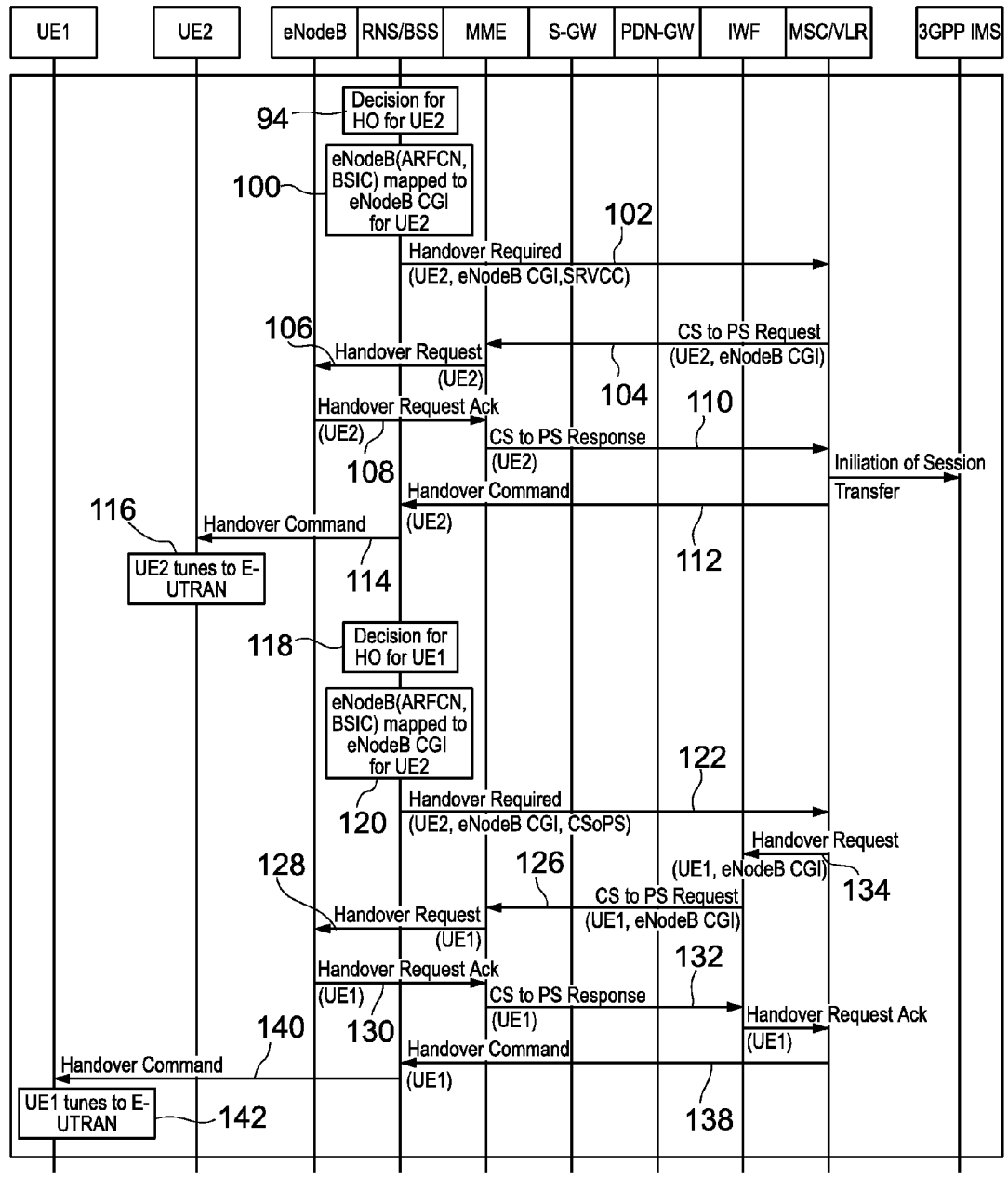
FIG. 5 illustrates the CS IRAT handover via SRVCC and CSoPS according to a second embodiment of the invention.

FIG. 5 illustrates the steps of the method according to a second embodiment of the invention when the BSC/RNC 4 detects the need of a CS IRAT handover to LTE for UE2 (respectively U1) in which RNC/BSC 4 provides MSC/VLR 8 with a indicator (SRVCC/CSoPS) according to whether the call is SRVCC or CSoPS.

At step 99, the BSC/RNC 4 takes a decision to handover UE2 to eNodeB 6.

At step 100, the eNodeB ARFCN (Absolute Radio Frequency Channel Number) and the eNodeB BSIC (Base Station Identity Code) are mapped to eNodeB CGI (Cell Global Identity) for UE2 as illustrated in the RNC/BSC mapping table of FIG. 2D.

At step 102, BSC/RNC 4 maps the UE capabilities to the CS IRAT handover indicator according to its mapping table as illustrated in FIG. 2D and transmits to MSC/VLR 8 a message requesting an SRVCC handover to eNodeB 6 for UE2.

At step 104, the MSC/VLR 8 retrieves the target node address (MME address) associated to the SRVCC indicator using its routing table as illustrated at FIG. 2E and the MSC/VLR 8 forwards said SRVCC handover request to the MME node 10.

At step 106, the MME node 10 forwards said handover request message to the target eNodeB 6.

At step 108, the target eNodeB 6 sends an acknowledgement to the MME node 10.

At step 110, the MME node 10 transmits to MSC/VLR 8 a message comprising a response to the handover request of UE2 from CS to PS.

At step 112, the MSC/VLR 8 sends to the BSC/RNC 4 a Handover Command.

At step 114, BSC/RNC 4 forwards Handover Command to UE2.

At step 116, UE2 tunes to E-UTRAN.

At step 118, the BSC/RNC 4 initiates a CS IRAT handover to LTE for UE1, using CSoPS.

At step 120, the eNodeB ARFCN (Absolute Radio Frequency Channel Number) and the eNodeB BSIC (Base Station Identity Code) are mapped to eNodeB CGI for UE2 as illustrated in the RNC/BSC mapping table of FIG. 2D.

At step 122, the BSC/RNC 4 maps the UE capabilities to the CS IRAT handover indicator according to its mapping table as illustrated in FIG. 2D and transmits to the MSC/VLR/VLR 8 a CSoPS handover request message comprising UE1 ID, eNodeB CGI.

At step 124, the MSC/VLR 8 retrieves the target node address (IWF address) associated to the CSoPS indicator using its routing table as illustrated at FIG. 2E and the MSC/VLR/VLR 8 transmits to the IWF 12 a handover request message comprising UE1 ID and eNodeB CGI.

At step 126, the IWF node 12 forwards the handover request from CS to PS to the MME node 10 with the UE1 and the target eNodeB CGI.

At step 128, the MME node 10 transmits to the target eNodeB the handover request for UE1.

At step 130, the target eNodeB sends an acknowledgement to the MME node 10.

At step 132, the MME node 10 transmits to the IWF node 12 a response concerning the handover request for UE1.

At step 134, the IWF node 12 forwards said response to the MSC/VLR 8. The later sends, at step 138 a Handover Command to the BSC/RNC 4.

At step 140, the BSC/RNC 4 forwards the Handover Command to UE1 which execute said handover at step 142.

INDUSTRIAL APPLICABILITY

The invention is applicable to telecommunication field and a method to manage a CS IRAT (Circuit Switch Inter RAT (Radio Access technology)) handover of a user Equipment from a 2G/3G network to a LTE (Long Term Evolution) network. The invention is also applicable to a 2G/3G network BSC/RNC node, a 2G/3G network MSC node, and a User Equipment, and so on.

The invention claimed is:

1. A method to manage a Circuit Switch Inter Radio Access Technology (CS IRAT) handover of a user equipment (UE) from a 2G/3G network to a Long Term Evolution (LTE) network wherein at least two different routing paths corresponding to at least two different handover technologies are possible for transferring handover messages from a Base Station Controller/Radio Network Controller (BSC/RNC)

node of said 2G/3G network to a target eNodeB of said LTE network, said method comprising:

transmitting, by the UE, CS IRAT handover from 2G/3G to LTE capabilities to the BSC/RNC node;

selecting, by the BSC/RNC node, a routing paths among said different routing paths based on the UE capabilities for CS IRAT handover from 2G/3G to LTE and transmitting to a Mobile Switching Center/Visitor Location Register (MSC/VLR) node of said 2G/3G network a message comprising information indicative of the selected path corresponding to the selected CS handover technology; and transferring, by the MSC/VLR node, said handover message to said target eNodeB through a Mobility Management Entity (MME) node or through an Interworking Function (IWF) node depending on said information of the selected path corresponding to the selected CS handover technology;

wherein said information indicative of the selected path is a target cell identifier and when the RNC/BSC node detects the need to handover the UE to the LTE network for a CS call, the RNC/BSC node sends to the MSC/VLR a handover message including a target LTE cell ID (eNodeB CGI), in case SRVCC handover, or a virtual 2G/3G cell ID, in case of CSoPS handover, said IDs are pre-configured in the mapping and routing tables of BSC/RNC node, MSC/VLR node and the IWF node to allow the association of the LTE cell ID with the virtual 2G/3G cell ID.

2. A method according to claim 1, wherein said information indicative of the selected path is a supplementary parameter associated with an identifier of the selected CS handover technology.

3. A method according to claim 1, wherein the different handover technologies include the CS handover technologies Single Radio Voice Call Continuity (SRVCC) and Circuit switched over Packet Switched (CSoPS).

4. A method according to claim 3, wherein the UE capabilities for CS IRAT handover consist of the support of SRVCC handover from 2G/3G to LTE, or the support of CSoPS handover from 2G/3G to LTE or the support of both SRVCC and CSoPS handover from 2G/3G to LTE.

5. A method according to claim 2, wherein, when the RNC/BSC node detects the need to handover the UE to the LTE network for a CS call, the RNC/BSC node sends a handover message including a target LTE cell ID and an indicator informing the MSC/VLR whether the handover is a SRVCC or a CSoPS handover.

6. A method according to claim 1, wherein, if the target cell ID received by the MSC/VLR from RNC/BSC indicates a LTE cell, the MSC/VLR node sends the handover message to a MME node of the LTE network, else if the target cell ID received by the MSC/VLR node from RNC/BSC node indicates a 2G/3G cell, the MSC/VLR sends the handover message to a IWF node.

7. A method according to claim 5, wherein, if the indicator received by the MSC/VLR from RNC/BSC indicates SRVCC handover, the MSC/VLR node sends the handover message to the MME node of the LTE network, else if the indicator received by the MSC/VLR node from RNC/BSC node indicates CSoPS handover, the MSC/VLR sends the handover message to the IWF node.

* * * * *